(12) United States Patent
Jayaram et al.

(10) Patent No.: US 8,996,726 B2
(45) Date of Patent: Mar. 31, 2015

(54) METHODS AND APPARATUS FOR EVENT DISTRIBUTION AND ROUTING IN PEER-TO-PEER OVERLAY NETWORKS

(75) Inventors: Ranjith S. Jayaram, San Diego, CA (US); Edward Thomas Lingham Hardie, Menlo Park, CA (US); Lakshminath Reddy Dondeti, San Diego, CA (US); Vidya Narayanan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 282 days.

(21) Appl. No.: 12/487,513

(22) Filed: Jun. 18, 2009

(65) Prior Publication Data

US 2010/0049869 A1 Feb. 25, 2010

Related U.S. Application Data

(60) Provisional application No. 61/073,909, filed on Jun. 19, 2008, provisional application No. 61/073,920, filed on Jun. 19, 2008.

(51) Int. Cl.
G06F 15/173 (2006.01)
G06F 15/16 (2006.01)
(Continued)

(52) U.S. Cl.
CPC .............. *H04L 67/104* (2013.01); *H04L 45/02* (2013.01); *H04L 45/028* (2013.01); *H04L 67/1059* (2013.01)
USPC .......................................... 709/242; 709/204

(58) Field of Classification Search
CPC ..... H04L 45/02; H04L 45/028; H04L 67/104; H04L 67/1059

USPC .................................................. 709/242, 204
See application file for complete search history.

(56) References Cited

U.S. PATENT DOCUMENTS

2005/0060406 A1* 3/2005 Zhang et al. ................. 709/225
2005/0223102 A1 10/2005 Zhang et al.
(Continued)

FOREIGN PATENT DOCUMENTS

CN 1691619 A 11/2005
CN 101179466 A 5/2008
(Continued)

OTHER PUBLICATIONS

Gupta, et al, "Efficient Routing for Peer-to-Peer Overlays," MIT Computer Science and Artificial Intelligence Laboratory, 2004, pp. 1-14, (Gupta).*

(Continued)

*Primary Examiner* — Joon H Hwang
*Assistant Examiner* — Suraj Joshi
(74) *Attorney, Agent, or Firm* — Kristine U. Ekwueme (57) ABSTRACT

Methods and apparatus for event distribution and routing in peer-to-peer overlay networks. A method is provided for event distribution and routing in a peer-to-peer overlay network that comprises a plurality of nodes. The method includes identifying a plurality of buckets on the overlay network, wherein each bucket includes one or more nodes, respectively, identifying bucket groups, wherein each bucket group includes a selected number of buckets, respectively, distributing events based on the bucket groups, and updating a routing table based on the events. A node includes a transceiver and a processor coupled to the transceiver and configured to identify a plurality of buckets on the overlay network, wherein each bucket includes one or more nodes, respectively, identify bucket groups, wherein each bucket group includes a selected number of buckets, respectively, distribute events based on the bucket groups, and update a routing table based on the events.

38 Claims, 6 Drawing Sheets

(51) Int. Cl.
*H04L 29/08* (2006.01)
*H04L 12/751* (2013.01)
*H04L 12/759* (2013.01)

(56) References Cited

U.S. PATENT DOCUMENTS

2009/0092144 A1* 4/2009 Wepiwe et al. ............... 370/406
2009/0210489 A1* 8/2009 Deb et al. ..................... 709/204

FOREIGN PATENT DOCUMENTS

| | | |
|---|---|---|
| EP | 1515520 A2 | 3/2005 |
| EP | 1926276 A1 | 5/2008 |
| JP | 2005323346 A | 11/2005 |
| JP | 2007300271 A | 11/2007 |
| JP | 2007336481 A | 12/2007 |
| KR | 20060045065 A | 5/2006 |
| KR | 20070106971 A | 11/2007 |
| TW | 200638723 | 11/2006 |
| TW | 200822625 A | 5/2008 |
| WO | WO2007030742 A2 | 3/2007 |

OTHER PUBLICATIONS

Bryan, et al: "Concepts and Terminology for Peer to Peer SIP", Cisco Systems; P2PSIP Working Group; Internet-Draft; Mar. 4, 2007.
Gupta, et al: "Efficient Routlng for Peer-to-PeerOverlays"; MIT Computer Science and Artificial Laboratory; csail.mit.edu.
Guha, et al: "NAT Behavioral Requirements for TCP draft-ietf-behave-tcp-7.txt"; Cisco Systems; Network Working Group; Internet-Draft; Oct. 30, 2007.
Cheshire, et al: "DNS-Based Service Discovery"; Apple Inc.; Internet-Draft; Sep. 10, 2008.
Cheshire, et al: "Multicast DNS"; Apple Inc.; Internet-Draft, Sep. 10, 2008.
Rosenberg, J.; "Interactive Connectivity Establishment (ICE): A Protocol for Network Address Translator (NAT) Traversal for Offer/Answer Protocols"; Cisco Systems; Internet-Draft; Oct. 29, 2007.
Rosenberg, J.: "TCP Candidates with Interactive Connectivity Establishment (ICE)"; Cisco Systems; Internet-Draft; Feb. 25, 2008.
Rosenberg, J.: "NICE: Non Session Initiation Protocol (SIP) Usage of Interactive Connectivity Establishment (ICE)"; Cisco Systems; Internet-Draft; Feb. 15, 2008.
Rosenberg, et al: "Session Traversal Utilities for (NAT) (STUN)"; Cisco Systems; Internet-Draft; Feb. 23, 2008.
Rosenberg, et al: "Traversal Using Relays Around NAT (TURN); Relay Extensions to Session Traversal Utilities for NAT (STUN)"; Cisco Systems; Internet-Draft; Feb. 25, 2008.
International Search Report and Written Opinion—PCT/US2009/048044—ISA/EPO—Feb. 15, 2010.
Taenaka Y et al., "A High Speed Search Algorithm using Reproduction of Chord's Hush Space," Technical Report 2006-DSM-40, The Information Processing Society of Japan, Mar. 29, 2006, vol. 2006, No. 38, pp. 25-30. (Abstract).
Taiwan Search Report—TW098120673—TIPO—Dec. 18, 2012.
Yang, W. "A Novel Self—Organization Mechanism for Nodes Management in P2P Networks," Computer Technology and Development, Jul. 31, 2006, vol. 16 No. 7, pp. 57-59.

* cited by examiner

| Routing | # of nodes | Bandwidth | Size of routing table |
|---|---|---|---|
| One Hop | $10^6$ | 128 kbps | 40 MB |
| Two Hop | $10^6$ | 256 bps | 80 kB |
| Two Hop | $10^8$ | 2.56 kbps | 800 kB |
| Three Hop | $10^6$ | 38.4 bps | 12 kB |
| Three Hop | $10^9$ | 384 bps | 128 kB |

METHODS AND APPARATUS FOR EVENT DISTRIBUTION AND ROUTING IN PEER-TO-PEER OVERLAY NETWORKS

CLAIM OF PRIORITY UNDER 35 U.S.C. §119

The present application for patent claims priority to Provisional Application No. 61/073,909 entitled "Methods and Apparatus for Information Dissemination in Overlay Networks" filed Jun. 19, 2008, and assigned to the assignee hereof and hereby expressly incorporated by reference herein.

The present application for patent claims priority to Provisional Application No. 61/073,920 entitled "Methods and Apparatus for Distributed Constant-Hop Routing in Overlay Networks" filed Jun. 19, 2008, and assigned to the assignee hereof and hereby expressly incorporated by reference herein.

BACKGROUND

1. Field

The present application relates generally to the operation of overlay networks, and more particularly, to methods and apparatus for event distribution and routing in peer-to-peer overlay networks.

2. Background

A network in which member nodes obtain services in the absence of server-based infrastructure is referred to herein as a "peer-to-peer" overlay network. In a peer-to-peer overlay, peer nodes cooperate with each other both to provide services and to maintain the network. Peer-to-peer overlay networks can be built on top of an underlying network, such as a network utilizing the Internet Protocol (IP).

Typically, the routing of events on peer-to-peer overlay networks presents trade-offs relating to routing latency, bandwidth utilization, and routing table size. For example, it is desirable to have small latencies when routing events. However, to achieve small latencies may result in large routing tables, which may not fit into the available resources of nodes participating on the overlay network. Furthermore, large routing tables may result in poor bandwidth utilization, since significant bandwidth is needed to communicate the routing tables over the overlay network and any changes that occur over time.

Conventional systems have utilized techniques in an attempt to manage the above mentioned trade-offs. For example, some system utilize very large routing tables, which as stated above, may decrease latency but may also strain or exceed the resources at participating nodes. Other systems utilize special nodes in the overlay network that assume more responsibility for event dissemination. However, the bandwidth requirements on these special nodes are so substantial as to require them to be reasonably provisioned.

Unfortunately, the techniques used by conventional system may result in routing tables on different nodes being inconsistent leading to propagation delays. Also, different routing tables may have different lengths and entries, which may result in different propagation trees to disseminate events from the same event originator. Furthermore, different routing tables may result in "holes" such that some nodes may not receive a disseminated event.

Therefore, it is desirable to have an efficient mechanism for event distribution and routing in peer-to-peer overlay networks that overcomes the problems associated with conventional systems.

SUMMARY

In one or more aspects, an event distribution system, comprising methods and apparatus, is provided for event distribution and routing in peer-to-peer overlay networks.

In an aspect, a method is provided for event distribution and routing in a peer-to-peer overlay network that comprises a plurality of nodes. The method comprises identifying a plurality of buckets on the overlay network, wherein each bucket comprises one or more nodes, respectively, identifying bucket groups, wherein each bucket group comprises a selected number of buckets, respectively, distributing events based on the bucket groups, and updating a routing table based on the events.

In an aspect, an apparatus is provided for event distribution and routing in a peer-to-peer overlay network that comprises a plurality of nodes. The apparatus comprises means for identifying a plurality of buckets on the overlay network, wherein each bucket comprises one or more nodes, respectively, means for identifying bucket groups, wherein each bucket group comprises a selected number of buckets, respectively, means for distributing events based on the bucket groups, and means for updating a routing table based on the events.

In an aspect, a node is provided that is configured for event distribution and routing in a peer-to-peer overlay network that comprises a plurality of nodes. The node comprises a transceiver and a processor coupled to the transceiver. The node is configured to identify a plurality of buckets on the overlay network, wherein each bucket comprises one or more nodes, respectively, identify bucket groups, wherein each bucket group comprises a selected number of buckets, respectively, distribute events based on the bucket groups, and update a routing table based on the events.

In an aspect, a computer program product is provided for event distribution and routing in a peer-to-peer overlay network that comprises a plurality of nodes. The computer program product comprises a computer-readable medium embodying codes executable to identify a plurality of buckets on the overlay network, wherein each bucket comprises one or more nodes, respectively, identify bucket groups, wherein each bucket group comprises a selected number of buckets, respectively, distribute events based on the bucket groups, and update a routing table based on the events.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of an event distribution system for event distribution and routing in peer-to-peer overlay networks. In an aspect, a fixed number of "buckets" are identified that are used to form a "view" imposed on a node's routing table. For example, the nodes participating on the overlay network are assigned to a particular bucket. As a result, dissemination trees can be formed from the identified buckets and an array representation of the dissemination tree has a fixed length. The system operates to manage the trade-offs associated with latency, bandwidth utilization and routing table size by providing for one, two, and three-hop routing that allows these trade-offs to be efficiently managed.

The system is especially well suited for peer-to-peer overlay networks using IP network environments, but may be used in any type of network environment, including but not limited to, communication networks, public networks, private networks, such as virtual private networks (VPN), local area networks, wide area networks, long haul network, and/or any other type of network environment.

The foregoing aspects described herein will become more readily apparent by reference to the following definitions.

Overlay Network
  An overlay network is a network in which peer nodes co-operate with each other both to provide services and to maintain the network. An overlay network may comprise virtually any number of nodes.

Bucket
  A bucket is a grouping of proximate nodes. An overlay network may comprise a total of "N" buckets up to the number of nodes in the overlay network, at which point each bucket would comprise one node. For example, an overlay network may comprise 1000 nodes that are grouped into a total of N=100 buckets, wherein each bucket includes 10 nodes. However, it should be noted that the number of nodes in each bucket may be different.

Sibling Nodes
  Nodes within a bucket are referred to as siblings "s."

Bucket Group
  A bucket group is a grouping of buckets to achieve a desired overlay network organization and routing. "n" represents the total number of bucket groups. Each bucket group comprises "m" buckets so that (n*m)=N, the total number of buckets. For ease of visualization, each bucket group is represented by buckets having the same shading as illustrated in the associated Figures.

Buddy Buckets
  Refers to buckets within the same bucket group.

Neighborhood
  A neighborhood is a collection of buckets comprising at least one bucket from each of the n bucket groups.

Event
  An event occurs when a node joins or leaves an overlay network, or when a neighborhood update occurs.

Multi-Level Grouping
  In multi-level grouping, bucket groups are themselves grouped into additional groups. For example, in two-level grouping, o groups of n bucket groups are defined so that the total number of buckets can be determined from N=(o*n*m). It is also possible to have more than two level grouping; however, the level of grouping should be balanced against increases in routing table size or latency.

Figure 1:
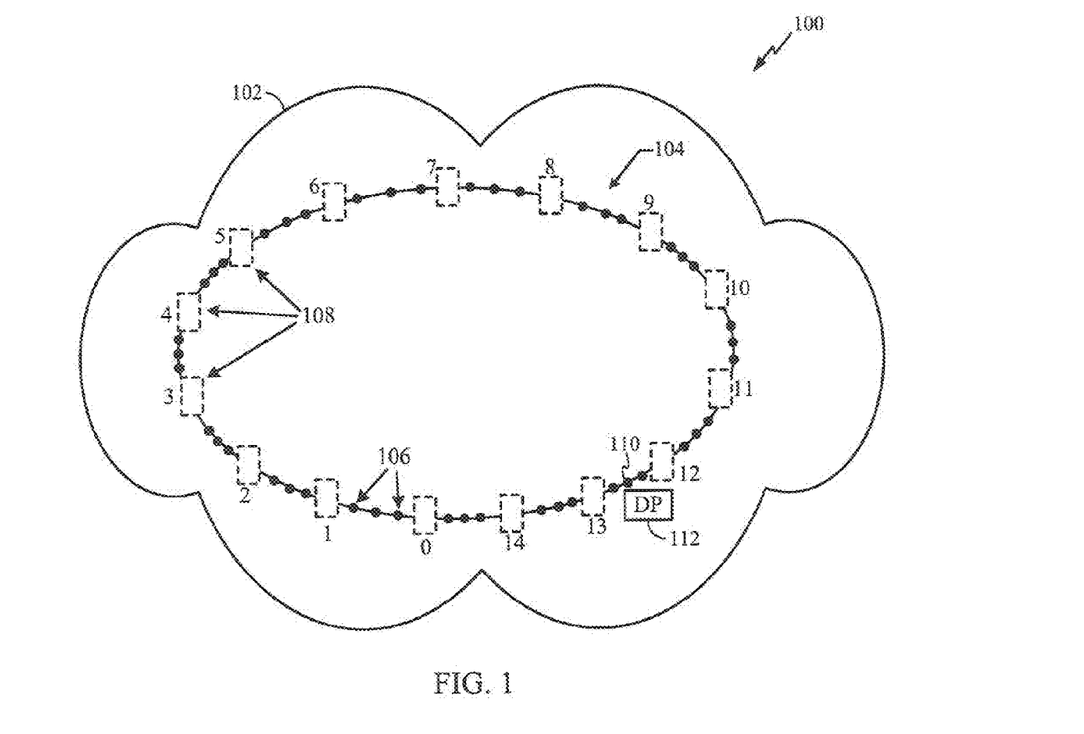
FIG. 1 shows a network that illustrates aspects of an event distribution system.

FIG. 1 shows a network 100 that illustrates aspects of an event distribution system. The network 100 comprises an underlying network 102 which comprises any type of network, such as an Internet Protocol network. Although the underlying network 102 is shown as a single entity, the underlying network may comprise any number or types of networks such as WANs, LANs, wireless networks or any other type of network.

A peer-to-peer overlay network 104 comprises a subset of the nodes of the underlying network 102 and operates utilizing the services of the underlying network 102 to allow those nodes to communicate. For example, nodes, shown generally at 106, are connected by communication links to form a circular routing path around the peer-to-peer overlay network 104. The communication links may be secure tunnels provided by the underlying network 102. It should be noted that the peer-to-peer overlay network 104 may have any topology or architecture to enable any routing pattern and it is not limited to the routing shown in FIG. 1. For example, the nodes 106 of the overlay network 104 may have many more interconnections to provide other routing paths in addition to the circular path shown.

During operation of the event distribution system, the peer-to-peer overlay network topology is divided into N buckets, shown generally at 108. Every node in the overlay is assigned to a bucket based on its place in the overlay network topology so that each bucket comprises s sibling nodes. It should be noted that the number of sibling nodes in each bucket may be different. The buckets are then grouped in one or more ways. For example, n bucket groups are generated so that each group comprises a selected number of buckets m. For ease of visualization, each bucket group is represented graphically by buckets having the same shading. Neighborhoods are generated that comprise at least one bucket from every bucket group. To facilitate multi-hop routing, groups are formed that comprise groupings of bucket groups.

Referring again to FIG. 1, the peer-to-peer overlay network 104 is organized in accordance with the event distribution system to comprise buckets (0-14). Each of the nodes 106 are assigned to a bucket. In one implementation, all nodes between two buckets are assigned to the earlier bucket. For example, the higher order bits of a node identifier are used to determine a bucket identifier. However, it should be noted that any algorithm or assignment technique may be used to assign nodes to each bucket. Nodes within the same bucket are siblings to each other. Since the number of buckets is fixed, a dissemination tree formed using the buckets means that all nodes form the same view of a dissemination tree. For example, all nodes know the exact order of buckets through which a message should be routed across the overlay network 104.

In one implementation, a particular node acts as an event distribution server and operates to identify the buckets and corresponding bucket groups. For example, in the overlay network 104, the node 110 acts as the event distribution server. The node 110 comprises a distribution processor (DP) 112 that operates to identify the buckets (0-14) and thereby assign nodes to those buckets. The DP 112 also operates to determine bucket groups in accordance with the event distribution system described herein. The operation of the distribution processor (DP) 112 is described in more detail in another section of this document. It should also be noted that the identification of buckets and bucket groups can be performed in other ways. For example, a distributed process may be used so that multiple nodes operate to identify the buckets and bucket groups. In another implementation, the bucket information is provided to each node during network configuration, initialization, or registration.

Figure 2:
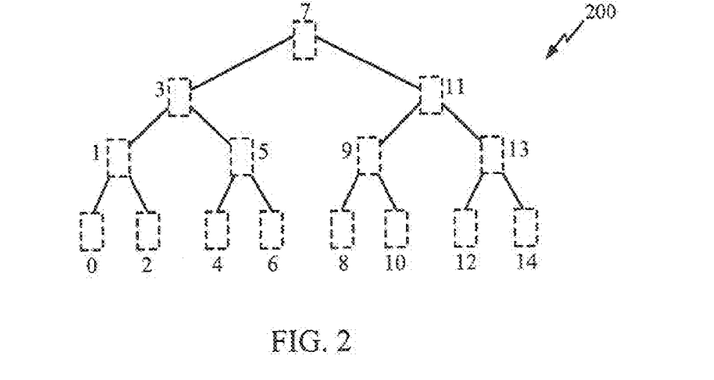
FIG. 2 shows a dissemination tree generated in accordance with an event distribution system.

FIG. 2 shows a dissemination tree 200 generated in accordance with an event distribution system. For example, the dissemination tree 200 is formed by the buckets (0-14) shown in FIG. 1 and represents a fixed length array. For event dissemination, a node in a particular bucket notifies siblings in its own bucket and one or more nodes in its two child buckets. For example, a node in bucket 5 notifies its sibling nodes in bucket 5 and the nodes in its two child buckets 4 and 6.

Thus, in one implementation of the event distribution system, a fixed number of buckets are identified and these buckets operate to provide the same view of a dissemination tree at all nodes in the overlay network 104, thereby mitigating the effects of differences in routing tables that can occur in conventional systems.

One-Hop Routing and Analysis (No Siblings)

The following is an analysis of one-hop routing associated with the dissemination tree 200 shown in FIG. 2. For example, the following transmissions occur with respect to a node in response to events to be disseminated across the peer-to-peer overlay network 104.

1. A node receives one message from a node in its parent bucket about the event.
2. The node sends one acknowledgement to the node in its parent bucket.
3. The node forwards the message to one or more nodes in each child bucket.
4. The node receives one acknowledgement from the nodes in each child bucket.
5. The node forwards the message to all siblings in its own bucket
6. The node receives acknowledges from all siblings in its own bucket.

Furthermore, a binary propagation tree is assumed wherein the following conditions apply.

1. Half the nodes are leaves.
2. A node will be a leaf for half the events.
3. A node has to forward only half the events.

In an example, the following information will be assumed for the purpose of analyzing one-hop routing associated with the dissemination tree 200.

1. Message size=x bytes
2. Header size=Acknowledgment size=y bytes
3. Event rate=r events/second
4. There are no siblings within each bucket.

For the downstream analysis, the following transmissions occur.

1. One message from a parent for every event yields a transmission rate of $r*(x+y)$ bytes per second.
2. Acknowledgements for half the event from each child yields a transmission rate of $2*(r/2)*y$ bytes per second.
3. Total downstream bandwidth for one-hop is $D_1=r*(x+2y)$.

For the upstream analysis, the following transmissions occur.

1. Two messages to children for half the events yields $2*(r/2)*(x+y)$.
2. One acknowledge to parent for every event yields $r*y$ bytes per second.
3. Total upstream bandwidth for one-hop routing is $U_1=r*(x+2y)$ bytes per second.

Thus, in the case where the overlay network comprises one million nodes with one million buckets identified (i.e., no siblings), the following assumptions can be used to perform a bandwidth and routing table size analysis.

1. r=200 events per second.
2. x=20 bytes.
3. y=30 bytes.
4. routing table entry is 40 bytes.

By substituting these assumptions into the above equations, the following one-hop bandwidth and routing table size is obtained.

1. Bandwidth=128 kbps
2. Routing table size=40 megabytes

One-Hop Routing and Analysis (with Siblings)

The following is an analysis of one-hop routing associated with the dissemination tree 200 wherein it is assumed that there are s sibling nodes in each bucket. As a result, every node has (s−1) siblings. For example, the following transmissions occur with respect to a node in response to an event to be disseminated.

For the downstream analysis, the following transmissions occur.

1. One message from a parent for every 1/s events yields a transmission rate of $(r/s)*(x+y)$ bytes per second.
2. One message from sibling for (s−1)/s events yields $(s-1)/s*r*(x+y)$
3. Two acknowledges from children for half the events yields a transmission rate of $2*(r/2)*y$ bytes per second.
4. One acknowledgement from (s−1) siblings for all received events yields $(s-1)*r/s*(x+y)$
5. Total downstream bandwidth for one-hop is $D_1=r*(x+2y)$ For the upstream analysis, the following transmissions occur.

1. Two messages to children for half the events yields $2*r/2*(x+y)=r/s(x+y)$.
2. (s−1) messages to siblings for all received events yields $(s-1)*r/s*(x+y)$
3. One acknowledge to parent for every event yields $r/s*y$ bytes per second.
4. Once acknowledgement to siblings for (s−1)/s events yields $(s-1)/s*r*y$
5. Total upstream bandwidth for one-hop routing is $U_1=r*(x+2y)$ bytes per second.

Thus, in the case where each bucket comprises s nodes it can be seen that the bandwidth requirement is independent of the number of siblings. The number of siblings affects the burstiness of upstream traffic which can be exploited for power saving purposes.

One-Hop Routing and K-ary Event Propagation Trees

The following is an analysis of one-hop routing utilizing a k-ary tree instead of a binary tree for event dissemination. In a full k-ary tree, approximately (k−1)/k of the nodes are leaves. A node will be a leaf for a fraction (k−1)/k of all events and a node will have to forward only a fraction 1/k of the messages.

For the downstream analysis, the following transmissions occur.

1. One message from a parent yields a transmission rate of $r*(x+y)$ bytes per second.
2. k acknowledgements from children for 1/k of the events yields a transmission rate of $k*r/k*y$ bytes per second.
3. Total downstream bandwidth for one-hop is $D_{1k}=r*(x+2y)$ For the upstream analysis, the following transmission occur.

1. k messages to children for a fraction 1/k of the events yields $k*r/k*(x+y)=r(x+y)$.
2. One acknowledge to parent yields $r*y$ bytes per second.
3. Total upstream bandwidth for one-hop routing is $U_{1k}=r*(x+2y)$ bytes per second.

Thus, in the case where a k-ary dissemination tree is used it can be seen that the bandwidth requirement is independent of the degree of the tree. An increase in the degree of the tree affects the burstiness of the upstream traffic which can be exploited for power saving purposes.

Two-Hop Routing

Figure 3:
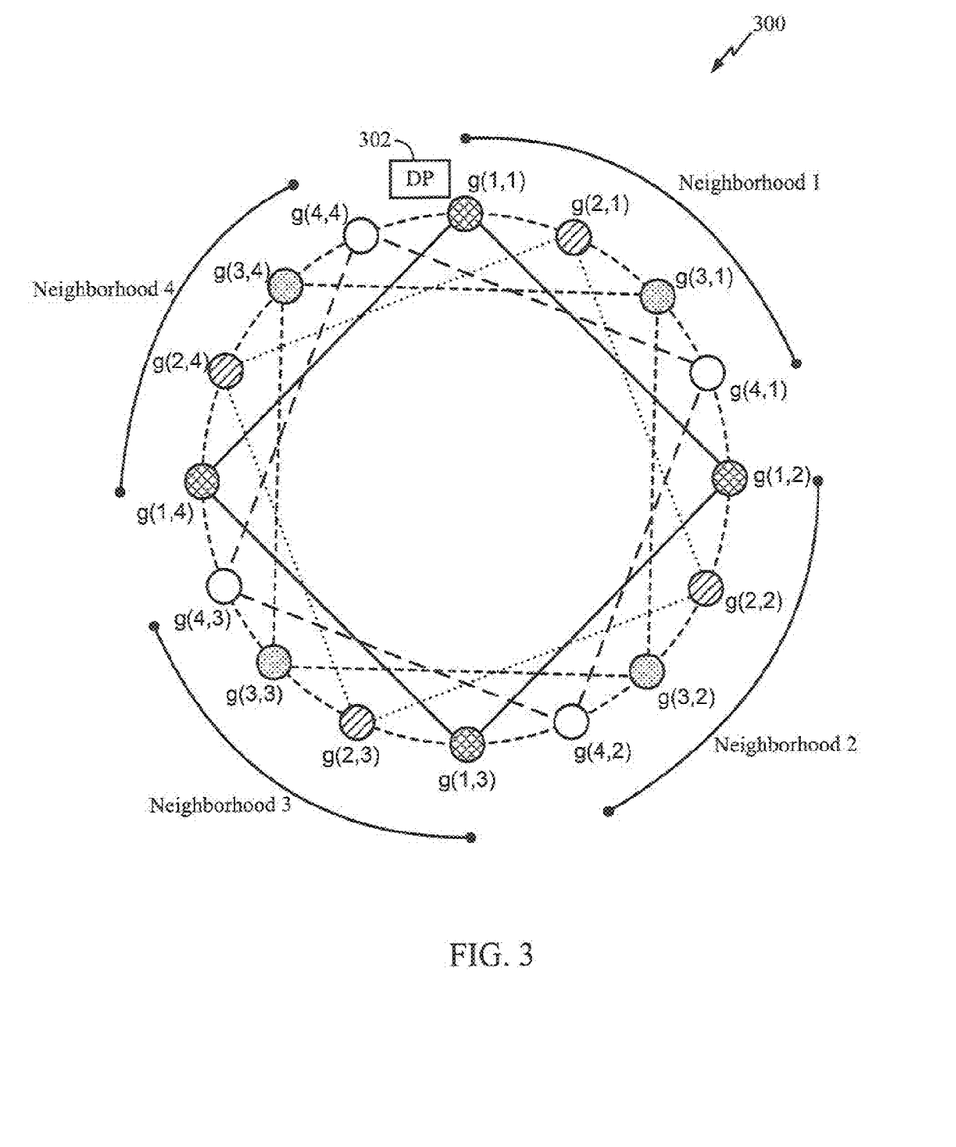
FIG. 3 shows a peer-to-peer overlay network configured for two-hop routing in accordance with aspects of an event distribution system.

FIG. 3 shows a peer-to-peer overlay network 300 configured for two-hop routing in accordance with aspects of an event distribution system.

In the overlay network 300, the N buckets have been divided into n groups of m buckets per group. Thus, the total number of buckets N can be determined from $N=(n*m)$. For example, the overlay network 300 illustrates N=16 buckets that have been divided into n=4 bucket groups comprising m=4 buckets per group. For clarity, the buckets of each group are identified by number and shading. For example, FIG. 3 illustrates the following bucket groups.
1. group 1—g(1,x) black shading
2. group 2—g(2,x) grey shading
3. group 3—g(3,x) pattern shading
4. group 4—g(4,x) no shading (clear)

Each of the buckets in FIG. 3 are denoted by group and respective bucket number (i.e., g(group#, bucket#)). Also shown are neighborhoods (1-4) wherein each neighborhood comprises one bucket from each group. The network 300 also comprises DP 302 located at a node in bucket g(1,1). The DP 302 operates in accordance with the event distribution system to identify the number of buckets, assignment of nodes to buckets, the number of groups, and the number of buckets in each group. It should be noted that the DP 302 is suitable for use as the DP 112 shown in FIG. 1.

In a first implementation, the distance between two consecutive buckets of the same group is always the number of buckets per group m. The order of buckets in a group is the same across all groups; similarly, the order of buckets in a neighborhood is the same across all neighborhoods. It should be noted that the grouping assignments used in FIG. 3 are used in all following illustrations.

In a second implementation, the distance between two consecutive buckets of the same shading is chosen using a mapping function. This approach may have desirable security properties due to the possibility of randomization.

In these implementations, a node of the overlay network 300 knows the following information,
1. A node knows about all nodes in the m buckets in its neighborhood including its own bucket. A neighborhood is represented by an arc of m buckets. In a first option, half the buckets in its neighborhood are on either side of its own bucket. Thus, this is a neighborhood of m buckets with its own bucket in the middle. In a second option, a neighborhood is represented by an arc of any m buckets that includes the node.
2. A node knows about all nodes in all the buckets in its group. These are referred to as "buddy" buckets and together they form a buddy network.

Two-Hop Routing Example

Figure 4:
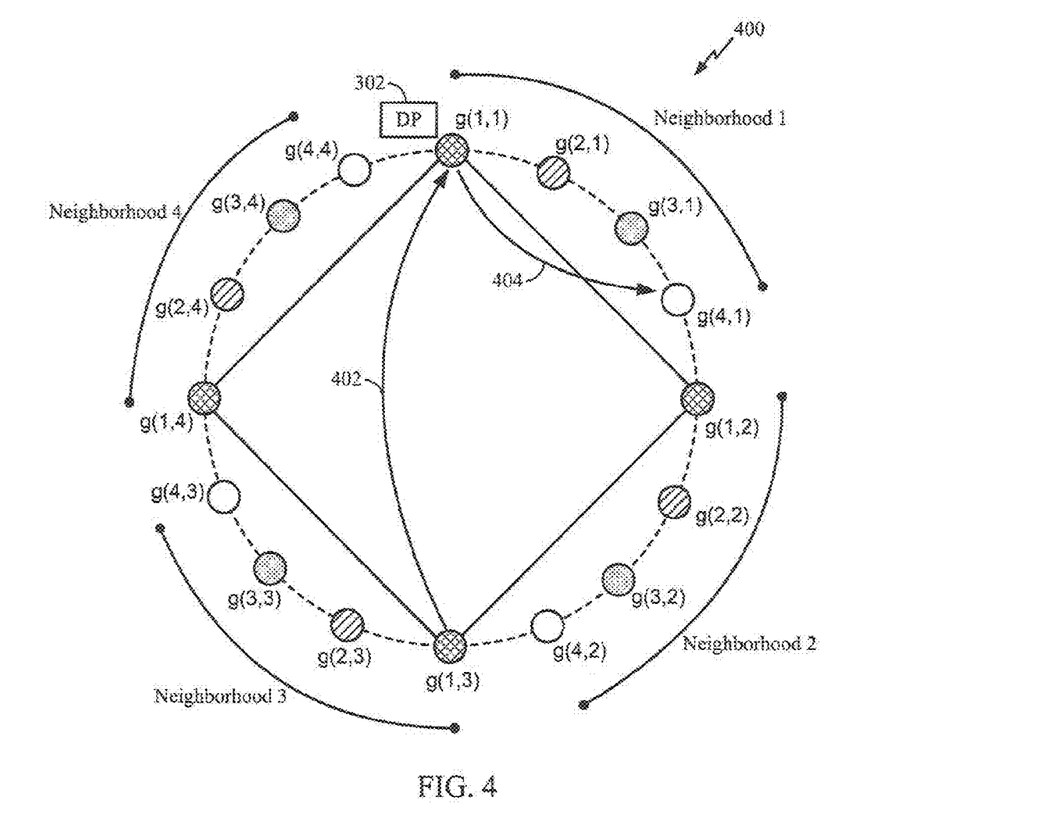
FIG. 4 shows a peer-to-peer overlay network that illustrates the process of two-hop routing in accordance with aspects of an event distribution system.

FIG. 4 shows a peer-to-peer overlay network 400 that illustrates the process of two-hop routing in accordance with aspects of an event distribution system. In the following description, one-hop routing is defined as routing from a first node to all the other nodes in the m buckets in the first node's own neighborhood. Two-hop routing is defined as routing from a first node to a second node in the first node's bucket group but in a different neighborhood, and then routing to a target node in the second node's neighborhood. For example, referring to FIG. 4, a first hop 402 occurs when a message is sent from a node in bucket g(1,3) in neighborhood 3 to a node in a buddy bucket g(1,1) in neighborhood 1, which is the neighborhood of the target node. A second hop 404 occurs when the message is sent from the node in a buddy bucket g(1,1) in neighborhood 1 to the target node in bucket g(4,1) in neighborhood 1.

The following illustrates a bucket configuration for two-hop routing in accordance with aspects of an event distribution system, wherein the following information is assumed.
1. A one million node network where n=m=1000.
2. Each node knows about the 1000 nodes (self included) in its neighborhood.
3. Each node knows about the 1000 nodes (self included) in its buddy network, each of whom knows about 1000 other nodes (self included).
4. The neighborhood arcs associated with all buddy buckets do not overlap with each other and are therefore mutually exclusive.
5. The neighborhood arcs of all buddy buckets cover all the buckets in the overlay network so that they are collectively exhaustive.

As a result, each node can reach $1000*1000=1,000,000$ nodes. For example, a node can reach all 1000 nodes in its neighborhood in one-hop. Furthermore, a node can reach all other nodes in two-hops using its buddy nodes (i.e., first hop to buddy node in target's neighborhood and second hop from buddy node in target's neighborhood to target node).

Event Propagation in Two-Hop Routing

To support two-hop routing, a node learns about joins/leaves in all buckets in its own neighborhood and all its buddy buckets. Two binary trees are used for event propagation. One tree comprises all buckets in a node's own neighborhood, which will be referred to as a local tree. Another tree comprises all buddy buckets, will be referred to as a buddy tree. During graceful leaves, a node notifies all other nodes before leaving. For node failures (i.e., graceless leaves) a monitor node detects the node failure and disseminates event to nodes in the failed node's buddy buckets.

It should be noted that the monitor node's buddy buckets may have different shading than the failed node's bucket (i.e., failed node in different group than monitor node). In this case, nodes in the monitor node's buddy buckets notify nodes in the failed node's buddy buckets, which may utilize one additional hop. For example, a node in a black bucket fails and there are no other nodes in that bucket. It will be assumed that a node in a grey bucket detects the failure and disseminates the information about the failure event to all grey buckets in that group. Nodes in the grey buckets then notify neighboring black buckets.

Two-Hop Routing Analysis

The following is an analysis of two-hop routing in accordance with aspects of an event distribution system. The following parameters are assumed.
1. Total number of buckets=N, defining n groups of m buckets each so that $n*m=N$
2. Message size=x
3. Header size=y
4. System event rate=r events/second
5. Event rate in each neighborhood=$r*(m/N)=r/n$
6. Event rate in buddy network=$r*(n/N)=r/m$
7. Assume no siblings in buckets and graceful joins and leaves.

For the downstream analysis, the following transmissions occur.
1. One message from parent in local tree yields $(r/n)*(x+y)$.
2. One message from parent in buddy tree yields $(r/m)*(x+y)$.
3. Two acknowledgements from children in local tree for half the local events yields $2*(r/2n)*y$.
4. Two acknowledgements from children in buddy tree for half the buddy events yields $2*(r/2m)*y$.
5. Total downstream bandwidth for two-hop routing is $D_2=r*(x+2y)*((m+n)/mn=D_1*(m+n)/mn$.

For the upstream analysis, the following transmissions occur.
1. Two messages to children in local tree for half the local events yields $2*(r/2n)*(x+y)$.
2. Two messages to children in buddy tree for half the local events yields $2*(r/2m)*(x+y)$.
3. One acknowledge to parent in local tree yields $(r/n)*y$.
3. One acknowledge to parent in buddy tree yields $(r/m)*y$.
3. Total upstream bandwidth for two-hop routing is $U_2=r*(x+2y)*((m+n)/mn)=U_1*(m+n)/mn$.

As can be seen from the above equations, in two-hop routing the bandwidth is minimized when $(m+n)/mn$ is minimized. However, $m*n$ is fixed (i.e., $m*n$ equals the total number of buckets N). Thus, for a fixed $m*n$, the quantity $(m+n)/mn$ is minimum when $m=n=\sqrt{m*n}$.

By way of example, the following parameters will be assumed.
1. A network comprising $10^6$ nodes
2. x=20 bytes
3. y=30 bytes
4. $m=n=\sqrt{10^6}=10^3$
5. Routing table entry size=40 bytes Substituting the above parameters into the equations for two-hop routing yields the following results.
1. Bandwidth=256 bps
2. Routing table size=$(m+n)*40$=2000 entries*40=80 kB.

Repeating the above operations for a network having $10^8$ nodes and r equal to 2000 events/second yields the following.
1. $m=n=10^4$
2. Bandwidth=2.56 kbps
3. Routing table size=20000 entries*40=800 kB.

Thus, as can be seen, two-hop routing provides for reduced bandwidth and small routing tables than one-hop routing.

Three-Hop Routing

In another implementation of the event distribution system, three-hop routing is provided. In three-hop routing, two-level grouping all buckets N are divided into o groups of n bucket groups of m buckets each. For example, in a $10^6$ node network where o=n=m=100, each node knows about the following.
1. 100 nodes in its neighborhood (one-hop routing to 100 nodes)
2. 100 other nodes, each of which can reach 100 more nodes in at most one-hop (providing two-hop routing to 1000 nodes).
3. 100 more nodes, each of which can reach 10000 nodes in at most two-hops (providing three-hop routing to $10^6$ nodes).

Three-Hop Routing Analysis

The following is an analysis of three-hop routing in accordance with aspects of an event distribution system. The following parameters are assumed.
1. Total number of buckets=N, where $m*n*o=N$
2. For a fixed $m*n*o$, the quantity $(m+n+o)/mno$ is a minimum when $m=n=o=\sqrt[3]{m*n*o}$
3. Message size=x Given the above parameters the following downstream and upstream bandwidths can be determined using an analysis similar to that provided above.

1. Downstream bandwidth $$D_3=r*(x+2y)*(m+n+o)/mno=D_1*(m+n+o)/mno$$

2. Upstream Bandwidth $$U_3=r*(x+2y)*(m+n+o)/mno=U_1*(m+n+o)/mno$$

To illustrate three-hop routing, the following parameters will be assumed.
1. A network comprising $10^6$ nodes
2. x=20 bytes
3. y=30 bytes
4. m=n=o=100
5. Routing table entry size=40 bytes Substituting the above parameters into the equations for three-hop routing yields the following results.
1. Bandwidth=38.4 bps
2. Routing table size=$(m+n+o)*40$=300 entries*40=12 kB.

Repeating the above operations for a network having $10^9$ nodes and r equal to 200,000 events/second yields the following.
1. m=n=o=1000
2. Bandwidth=384 bps
3. Routing table size=3000 entries*40=120 kB.

Comparison of Routing Implementations

Figure 5:
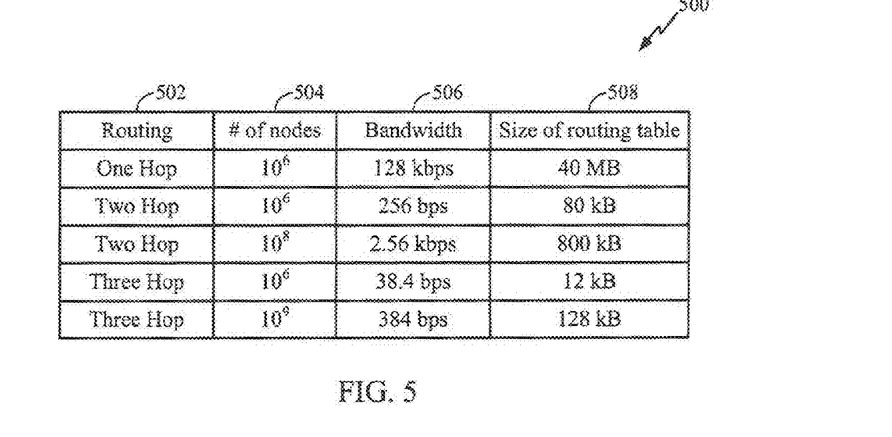
FIG. 5 shows a table that illustrates a comparison of various routing implementations in accordance with the event distribution system.

FIG. 5 shows a table 500 that illustrates a comparison of various routing implementations in accordance with the event distribution system. In general, for an n-hop routing implementation, the bandwidth and routing table size can be determined from the following.
1. Bandwidth $D_n=K*r*(x+2y)$
where $K=(m_1+m_2+m_3+\ldots+m_n)/(m_1*m_2*m_3*\ldots*m_n)$
2. Routing table size is $O*(n^{th}$ root of N)
where N is the total number of nodes/buckets.

As illustrated in FIG. 5, routing type 502, number of nodes 504, bandwidth 506, and size of routing table 508 are shown. Thus, the table 500 can be used to manage the trade-off between latency and bandwidth or routing table size. For example, in an overlay network having $10^6$ nodes, a grouping configuration providing three-hop routing results in the smallest routing table size illustrated in FIG. 5.

Figure 6:
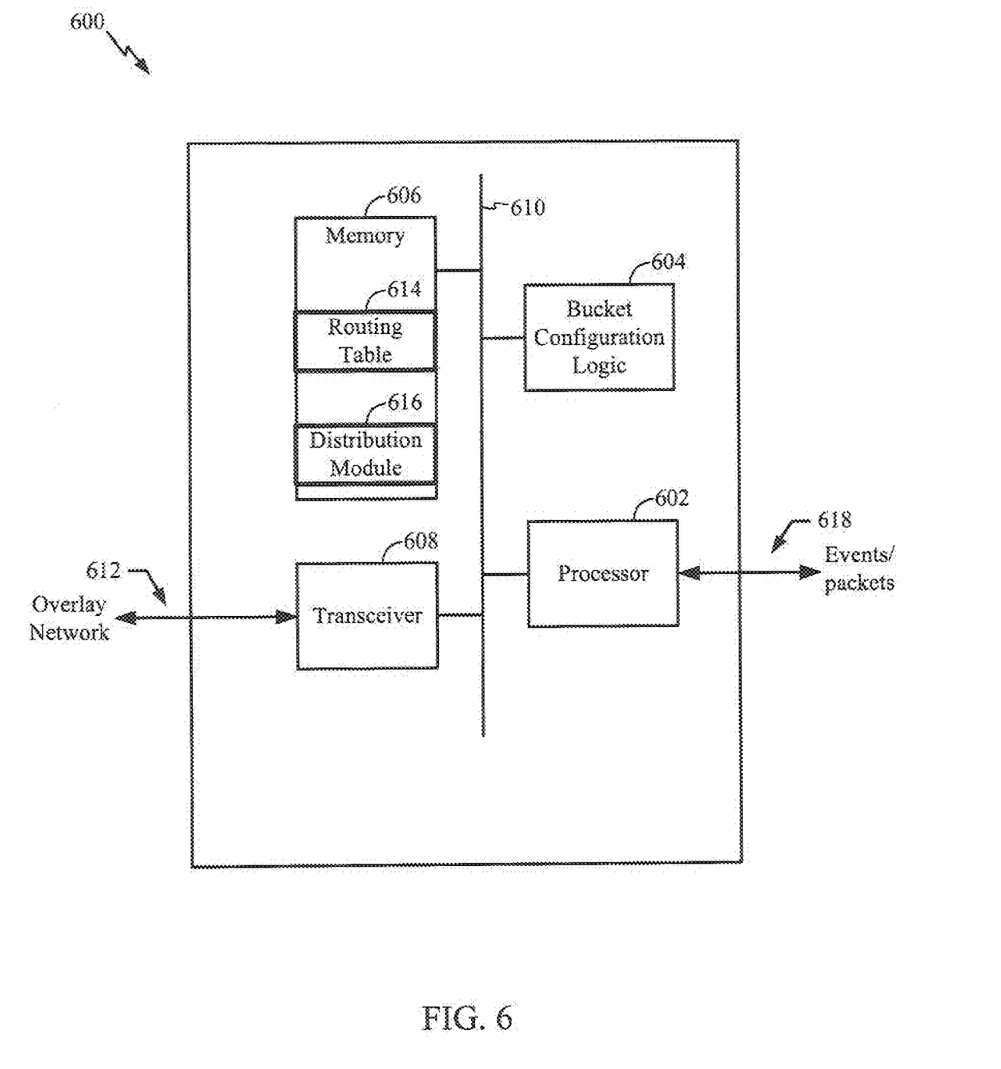
FIG. 6 shows an exemplary distribution processor for use at a node in aspects of an event distribution system.

FIG. 6 shows an exemplary distribution processor 600 for use in aspects of an event distribution system. For example, the DP 600 is suitable for use at a node in a peer-to-peer overlay network, for instance, as the DP 302 shown in FIG. 3. The DP 600 comprises processor 602, bucket configuration logic 604, memory 606, and transceiver 608 all coupled to a data bus 610. It should be noted that the DP 600 is just one implementation and that other implementations are possible within the scope of the aspects.

The transceiver 608 comprises hardware and/or hardware executing software that operates to allow the DP 600 to communicate data, events, or other information with a plurality of nodes on a peer-to-peer overlay network. In an aspect, the transceiver 608 is operable to establish one or more communication links 612 with nodes of the peer-to-peer overlay network. For example, the communication links 612 are formed utilizing the services of an underlying IP network.

The memory 606 comprises any suitable storage device operable to store a routing table 614 that describe message routing on a peer-to-peer overlay network using identified buckets. For example, the routing table 614 provides routing information to allow one, two, or three-hop routing in accordance with the event distribution system as described herein. The memory 606 is also operable to store distribution module 614 that includes one or more modules embodying instructions or codes executable by the processor 602 to provide the functions described herein.

The processor 602 comprises at least one of a CPU, processor, gate array, hardware logic, memory elements, and/or hardware executing software. In an aspect, the processor module 602 operates to execute instructions or codes of the distribution module 616 to control the DP 600 module to perform the functions describe herein.

In one implementation, the processor 602 operates to receive overlay network configuration parameters comprising node identifiers, bucket identifiers, and bucket group identifiers. The overlay network configuration parameters may be received from one or more nodes in the overlay network, or may be received from a centralized server during network configuration, initialization or registration processes. The overlay network configuration parameters may also be received from user input. The overlay network configuration parameters are stored in the memory 606 and the processor 602 operates to use these configuration parameters to initially generate a routing table that is stored in the memory 606 as routing table 614. The routing table 614 may be configured to provide one, two or three hop routing.

In another implementation, the bucket configuration logic 604 operates to generate the overlay network configuration parameters. The bucket configuration logic 604 comprises at least one of a CPU, processor, gate array, hardware logic, memory elements, and/or hardware executing software. The bucket configuration logic 604 operates to determine a fixed number of buckets and the nodes assigned to those buckets. The bucket configuration logic 604 also operates to perform bucket grouping to implement one level or multi-level grouping as described herein. The overlay network configuration parameters generated by the bucket configuration logic 604 is then stored in the memory 606 and also distributed to other nodes in the overlay network using the transceiver 608. The processor 602 may then retrieve these configuration parameters to initially generate the routing table 614. Other nodes in the overlay network perform the same functions to initially generate their own routing tables.

During operation, the transceiver 608 operates to receive one or more events, which are passed to the processor 602. The processor 602 operates to distribute the events based on the bucket groups in the routing table 614. The processor 602 also operates to updated the routing table 614 based on the received events. For example, when a node joins, leaves or an update to the neighborhood occurs, the processor 602 receives messages about these events. The processor 602 uses the routing table 614 to route these events on the overlay network. The processor 602 also operates to update the routing table 614 to reflect these changes. This operation is repeated at other nodes in the overlay network so that each node updates its own routing table. Thus, the system provides an efficient mechanism for event distribution and routing in peer-to-peer overlay networks In an aspect, the event distribution system comprises a computer program product having a computer program formed from one or more program instructions "instructions" or "codes" stored or embodied on a machine-readable medium. When the codes are executed by at least one processor, for instance, the processor 602, their execution causes the DP 600 to provide the functions of the event distribution system described herein. For example, the machine-readable medium comprises a floppy disk, CDROM, optical disk, memory card, FLASH memory device, RAM, ROM, or any other type of memory device or machine-readable medium that can be interfaced to the DP 600. In another aspect, the codes may be downloaded into the DP 600 from an external device or communication network resource and stored in the machine-readable medium for later execution. The sets of codes, when executed, operate to provide aspects of the event distribution system as described herein.

Figure 7:
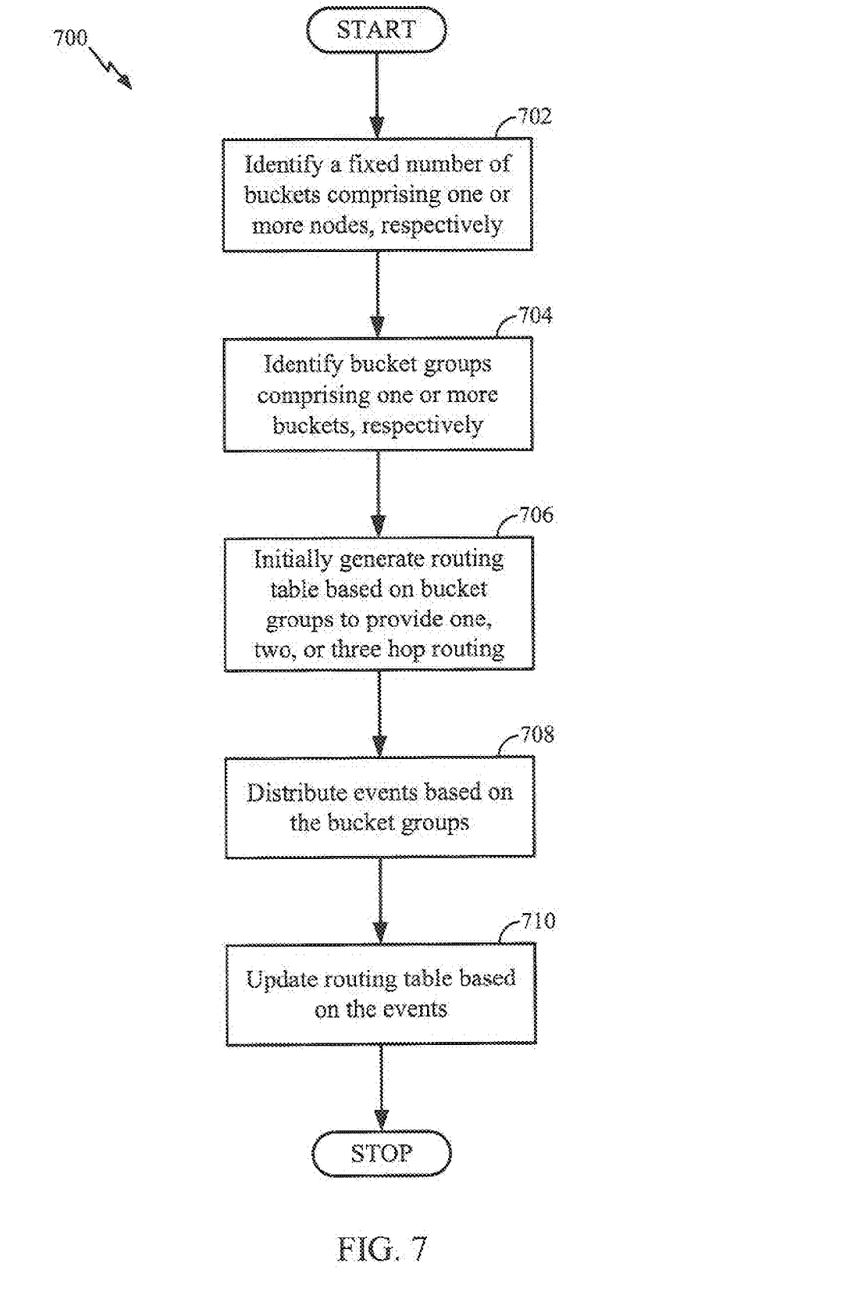
FIG. 7 shows an exemplary method for providing event routing in a peer-to-peer overlay network in accordance with an event distribution system.

FIG. 7 shows an exemplary method 700 for providing event routing in a peer-to-peer overlay network in accordance with an event distribution system. For example, the method 700 can be performed at a node by the DP 600 shown in FIG. 6.

For clarity, the method 700 is described below as being performed by the DP 600 shown in FIG. 6. In an aspect, the processor 602 executes one or more codes of the distribution module 616 stored in the memory 606 to control the DP 600 to perform the functions described below.

At block 702, a fixed number of buckets comprising one or more nodes in a peer-to-peer overlay network are identified. For example, the processor 602 operates to identify the buckets. In one aspect, the processor 602 identifies the buckets based on configuration information stored in the memory 606. For example, nodes on the overlay network are assigned to each bucket based on the locations of the buckets on the overlay network. For example, the higher bits of a node identifier are used to determine a bucket identifier. In one implementation, all nodes between two buckets are assigned to the bucket associated with a smaller identifier. However, it should be noted that any algorithm or assignment technique may be used to assign nodes to each bucket.

At block 704, a fixed number of bucket groups comprising one or more buckets are identified. For example, the processor 602 operates to identify the bucket groups. In one aspect, the processor 602 identifies the bucket groups based on configuration information stored in the memory 606.

At block 706, a routing table is initially generated based on the bucket groups to provide one, two, or three hop routing. In an aspect, the processor 602 operates to generate the routing table based on the bucket groups.

At block 708, received events are distributed based on the bucket groups of the routing table. In one implementation, the events comprise joins, leaves, or neighborhood updates. For example, the processor 602 operates to distribute the events based on the bucket groups of the routing table 614. The events are distributed on the overlay network using the transceiver 608.

At block 710, the routing table is updated based on the events. For example, the processor 602 updates the routing table 614 based on the joins, leaves, or neighborhood updates that are received.

Therefore, the method 700 can be performed to provide event distribution and routing table updates in a peer-to-peer overlay network in accordance with an event distribution system. It should be noted that the method 700 is just one implementation and that the operations of the method 700 may be rearranged or otherwise modified within the scope of the various aspects. Thus, other implementations are possible with the scope of the various aspects described herein.

Figure 8:
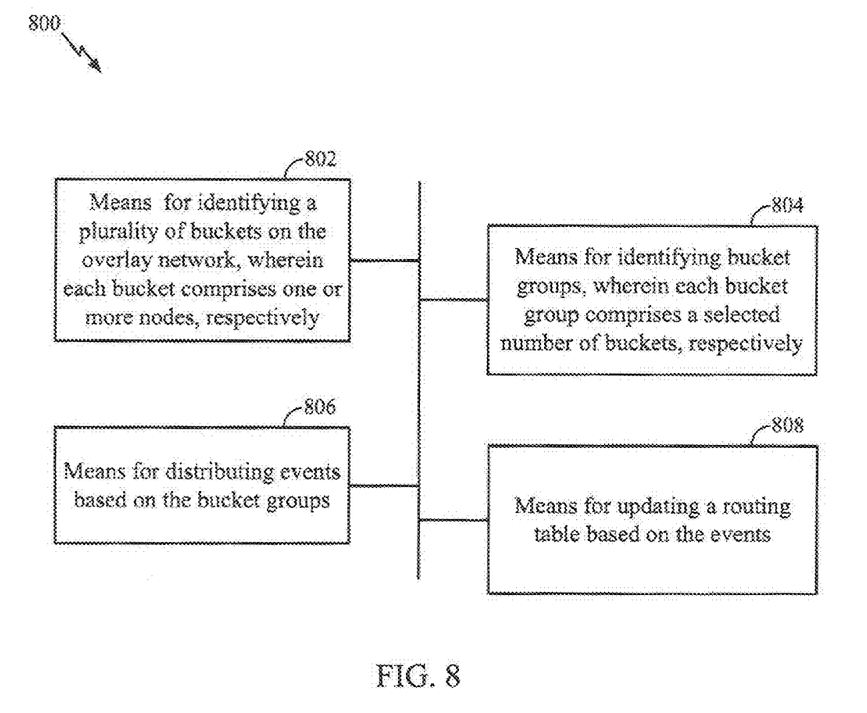
FIG. 8 shows an exemplary distribution processor for use at a node in aspects of an event distribution system.

FIG. 8 shows an exemplary distribution processor 800 for use at a node in aspects of an event distribution system. For example, the distribution processor 800 may be implemented as the distribution processor 600 shown in FIG. 6. In an aspect, the distribution processor 800 is implemented by at least one integrated circuit comprising one or more modules configured to provide aspects of an event distribution system as described herein. For example, in an aspect, each module comprises hardware and/or hardware executing software.

The distribution processor 800 comprises a first module comprising means (802) for identifying a plurality of buckets on the overlay network, wherein each bucket comprises one or more nodes, respectively, which in an aspect comprises the processor 602. The distribution processor 800 also comprises a second module comprising means (804) for identifying bucket groups, wherein each bucket group comprises a selected number of buckets, respectively, which in an aspect comprises the processor 602. The distribution processor 800 also comprises a third module comprising means (806) for distributing events based on the bucket groups, which in an aspect comprises the transceiver 608. The distribution processor 800 also comprises a fourth module comprising means (808) for updating a routing table based on the events, which in an aspect comprises the processor 602.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an event distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for event distribution and routing in a peer-to-peer overlay network comprising a plurality of nodes, the method comprising:

identifying a plurality of buckets on the overlay network, wherein each bucket comprises one or more nodes, respectively;

identifying bucket groups, wherein each bucket group comprises a selected number of buckets, respectively, wherein for a particular bucket group each of the buckets of the particular bucket group is adjacent to two other buckets of two other respective bucket groups, and wherein a distance between each of the buckets of the particular bucket group corresponds to a number of the bucket groups on the overlay network;

distributing events based on the bucket groups, wherein the events comprise a first event when at least one of the plurality of nodes joins the overlay network; and updating a routing table based on the events.

2. The method of claim 1, wherein said updating comprises updating the routing table to form a dissemination tree having a fixed array length.

3. The method of claim 1, wherein said identifying the plurality of buckets comprises identifying the plurality of buckets totaling N buckets.

4. The method of claim 3, wherein said identifying the bucket groups comprises identifying the bucket groups to form a total of n bucket groups comprising m buckets per group wherein $N=n*m$.

5. The method of claim 3, wherein said identifying the bucket groups comprises identifying the bucket groups to form a total of o groups of n bucket groups comprising m buckets per bucket group wherein $N=n*m*o$.

6. The method of claim 5, wherein said updating the routing table comprises updating the routing table based on the events to facilitate three-hop routing.

7. The method of claim 1, wherein said updating the routing table comprises updating the routing table based on the events to facilitate two-hop routing.

8. The method of claim 1, further comprising initially generating the routing table based on the bucket groups.

9. The method of claim 1, wherein the events further comprise a second event when the at least one of the plurality of nodes leaves the overlay network.

10. The method of claim 1, wherein at least one of the bucket groups comprises two or more buckets, and wherein a distance between two consecutive buckets of the at least one bucket group corresponds to the two or more buckets in the at least one bucket group.

11. An apparatus for event distribution and routing in a peer-to-peer overlay network comprising a plurality of nodes, the apparatus comprising:

means for identifying a plurality of buckets on the overlay network, wherein each bucket comprises one or more nodes, respectively;

means for identifying bucket groups, wherein each bucket group comprises a selected number of buckets, respectively, wherein for a particular bucket group each of the buckets of the particular bucket group is adjacent to two other buckets of two other respective bucket groups, and wherein a distance between each of the buckets of the particular bucket group corresponds to a number of the bucket groups on the overlay network;

means for distributing events based on the bucket groups, wherein the events comprise a first event when at least one of the plurality of nodes joins the overlay network; and means for updating a routing table based on the events.

12. The apparatus of claim 11, wherein said means for updating comprises means for updating the routing table to form a dissemination tree having a fixed array length.

13. The apparatus of claim 11, wherein said means for identifying the plurality of buckets comprises means for identifying the plurality of buckets totaling N buckets.

14. The apparatus of claim 13, wherein said means for identifying the bucket groups comprises means for identifying the bucket groups to form a total of n bucket groups comprising m buckets per group wherein N=n*m.

15. The apparatus of claim 13, wherein said means for identifying the bucket groups comprises means for identifying the bucket groups to form a total of o groups of n bucket groups comprising m buckets per bucket group wherein N=n*m*o.

16. The apparatus of claim 15, wherein said means for updating the routing table comprises means for updating the routing table based on the events to facilitate three-hop routing.

17. The apparatus of claim 11, wherein said means for updating the routing table comprises means for updating the routing table based on the events to facilitate two-hop routing.

18. The apparatus of claim 11, further comprising means for initially generating the routing table based on the bucket groups.

19. The apparatus of claim 11, wherein the events further comprise a second event when the at least one of the plurality of nodes leaves the overlay network.

20. A node configured for event distribution and routing in a peer-to-peer overlay network comprising a plurality of nodes, the node comprising:
    a transceiver coupled to a processor; and
    the processor performing:
        identifing a plurality of buckets on the overlay network, wherein each bucket comprises one or more nodes, respectively;
        identifing bucket groups, wherein each bucket group comprises a selected number of buckets, respectively, wherein for a particular bucket group each of the buckets of the particular bucket group is adjacent to two other buckets of two other respective bucket groups, and wherein a distance between each of the buckets of the particular bucket group corresponds to a number of the bucket groups on the overlay network;
        distributing events based on the bucket groups, wherein the events comprise a first event when at least one of the plurality of nodes joins the overlay network; and
        updating a routing table based on the events.

21. The apparatus of claim 20, wherein said processor updates the routing table to form a dissemination tree having a fixed array length.

22. The apparatus of claim 20, wherein said processor identifies the plurality of buckets totaling N buckets.

23. The apparatus of claim 22, wherein said processor identifies the bucket groups to form a total of n bucket groups comprising m buckets per group wherein N=n*m.

24. The apparatus of claim 22, wherein said processor identifies the bucket groups to form a total of o groups of n bucket groups comprising m buckets per bucket group wherein N=n*m*o.

25. The apparatus of claim 24, wherein said processor updates the routing table based on the events to facilitate three-hop routing.

26. The apparatus of claim 20, wherein said processor updates the routing table based on the events to facilitate two-hop routing.

27. The apparatus of claim 20, wherein said processor initially generates the routing table based on the bucket groups.

28. The apparatus of claim 20, wherein the events further comprise a second event when the at least one of the plurality of nodes leaves the overlay network.

29. The apparatus of claim 20, wherein at least one of the bucket groups comprises two or more buckets, and wherein a distance between two consecutive buckets of the at least one bucket group corresponds to the two or more buckets in the at least one bucket group.

30. A computer program product for event distribution and routing in a peer-to-peer overlay network comprising a plurality of nodes, the computer program product comprising:
    a non-transitory computer-readable medium embodying codes executable to:
        identify a plurality of buckets on the overlay network, wherein each bucket comprises one or more nodes, respectively;
        identify bucket groups, wherein each bucket group comprises a selected number of buckets, respectively, wherein for a particular bucket group each of the buckets of the particular bucket group is adjacent to two other buckets of two other respective bucket groups, and wherein a distance between each of the buckets of the particular bucket group corresponds to a number of the bucket groups on the overlay network;
        distribute events based on the bucket groups, wherein the events comprise a first event when at least one of the plurality of nodes joins the overlay network; and
        update a routing table based on the events.

31. The computer program product of claim 30, wherein said codes update the routing table to form a dissemination tree having a fixed array length.

32. The computer program product of claim 30, wherein said codes identify the plurality of buckets totaling N buckets.

33. The computer program product of claim 32, wherein said codes identify the bucket groups to form a total of n bucket groups comprising m buckets per group wherein N=n*m.

34. The computer program product of claim 30, wherein said codes update the routing table based on the events to facilitate two-hop routing.

35. The computer program product of claim 34, wherein said codes identify the bucket groups to form a total of o groups of n bucket groups comprising m buckets per bucket group wherein N=n*m*o.

36. The computer program product of claim 35, wherein said codes generate the routing table based on the events to facilitate three-hop routing.

37. The computer program product of claim 34, wherein said codes initially generate the routing table based on the bucket groups.

38. The computer program product of claim 30, wherein the events further comprise a second event when the at least one of the plurality of nodes leaves the overlay network.

* * * * *